(12) United States Patent
Ramarge et al.

(10) Patent No.: US 9,472,327 B1
(45) Date of Patent: Oct. 18, 2016

(54) HOLLOW CORE ARRESTER STRENGTH MEMBRANE

(71) Applicant: COOPER TECHNOLOGIES COMPANY, Houston, TX (US)

(72) Inventors: Michael M. Ramarge, Olean, NY (US); Timothy Stephen Smith, Fuquay Varina, NC (US); Jeremy Lane Martin, Friendship, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/976,468

(22) Filed: Dec. 21, 2015

(51) Int. Cl.
| | |
|---|---|
| H01C 7/10 | (2006.01) |
| H01C 7/13 | (2006.01) |
| H01C 7/12 | (2006.01) |
| B29C 70/52 | (2006.01) |
| B29C 70/18 | (2006.01) |
| B29C 63/06 | (2006.01) |
| B29C 63/00 | (2006.01) |
| B29C 70/70 | (2006.01) |
| H01C 17/00 | (2006.01) |
| B29K 63/00 | (2006.01) |
| B29K 105/08 | (2006.01) |
| B29K 309/08 | (2006.01) |
| B29L 23/00 | (2006.01) |
| B29L 31/34 | (2006.01) |

(52) U.S. Cl.
CPC ............ *H01C 7/12* (2013.01); *B29C 63/0021* (2013.01); *B29C 63/06* (2013.01); *B29C 70/18* (2013.01); *B29C 70/52* (2013.01); *B29C 70/70* (2013.01); *H01C 17/00* (2013.01); *B29K 2063/00* (2013.01); *B29K 2105/0809* (2013.01); *B29K 2105/0854* (2013.01); *B29K 2309/08* (2013.01); *B29K 2995/0007* (2013.01); *B29L 2023/00* (2013.01); *B29L 2031/3481* (2013.01)

(58) Field of Classification Search
CPC .................................. H01C 7/12; H01C 17/00
USPC .............................. 338/20, 21; 361/118, 126
See application file for complete search history.

(56) References Cited

U.S. PATENT DOCUMENTS

| | | | | |
|---|---|---|---|---|
| 4,092,694 A | * | 5/1978 | Stetson | H01C 7/12 313/269 |
| 4,812,944 A | * | 3/1989 | Eberhard | B29C 61/006 361/117 |
| 5,680,289 A | * | 10/1997 | Robinson | H01C 7/126 338/21 |
| 5,684,665 A | * | 11/1997 | Rudy | H01C 7/126 361/117 |
| 6,847,514 B2 | * | 1/2005 | Ramarge | H01C 7/12 361/111 |
| 8,305,184 B2 | * | 11/2012 | Klaube | H01C 7/12 338/21 |
| 8,629,751 B2 | * | 1/2014 | Maher | H01C 7/102 338/20 |

* cited by examiner

*Primary Examiner* — Kyung Lee
(74) *Attorney, Agent, or Firm* — Eckert Seamans Cherin & Mellott, LLC; Carol A. Marmo; Philip E. Levy

(57) ABSTRACT

The disclosed concept relates to hollow core arrester membranes generally and, in particular, to membranes that include a pultruded tube composed of fibers and resin, and one or more wrap layers composed of fibers and resin in the form of a mat or fabric. The one or more wrap layers are applied to the pultruded tube to form a wrapped, pultruded tube, which is over molded with a polymer enclosure.

20 Claims, 3 Drawing Sheets

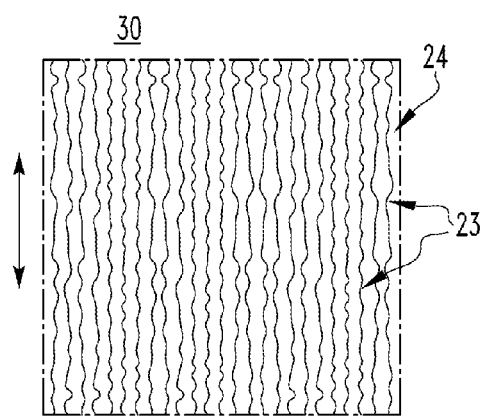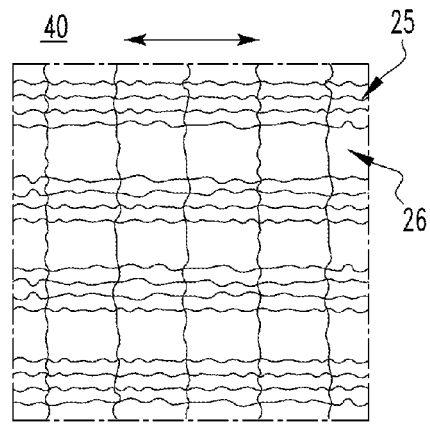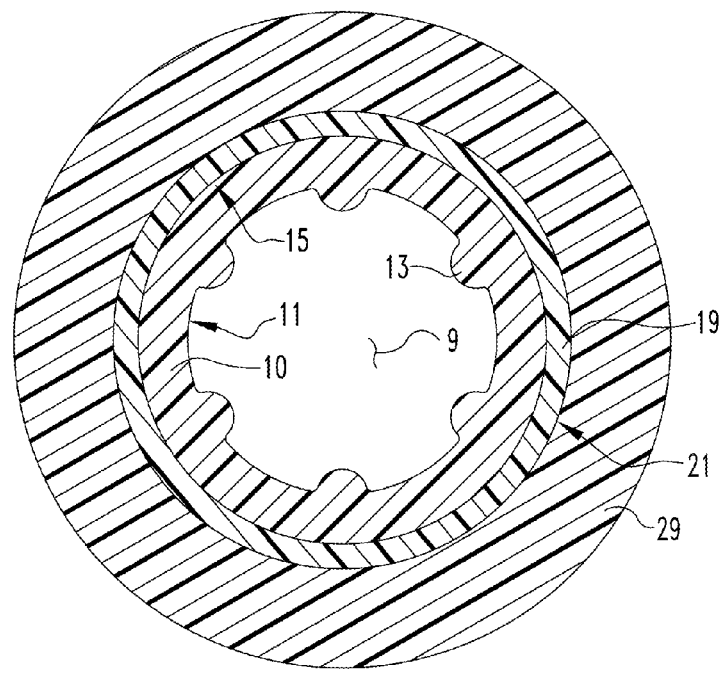

HOLLOW CORE ARRESTER STRENGTH MEMBRANE

BACKGROUND

1. Field

The disclosed concept pertains generally to arresters and, in particular, to hollow core arrester membranes structured to exhibit high strength in both longitudinal and radial directions.

2. Background Information

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment so as to shunt or divert over-voltage-induced current surges safely around the equipment, thereby protecting the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

Upon completion of the over-voltage condition, the surge arrester returns to operation in the high impedance mode. This prevents normal current at the system frequency from following the surge current to ground along the current path through the surge arrester.

Conventional surge arresters typically include an elongated outer enclosure or housing made of an electrically insulating material and a pair of electrical terminals at opposite ends of the enclosure for connecting the arrester between a line-potential conductor and electrical ground, and an array of other electrical components that form a series electrical paths between the terminals. The electrically insulating materials can be selected from those known in the art for use in arrester housings, such as, ceramic (e.g., porcelain) and polymer (e.g., rubber material including silicon rubber and ethylene propylene diene monomer (EPDM) rubber). The other components typically include a stack of voltage-dependent, nonlinear resistive elements, referred to as varistors. A varistor is characterized by having a relatively high resistance when exposed to a normal operating voltage, and a much lower resistance when exposed to a larger voltage, such as is associated with over-voltage conditions. In addition to varistors, a surge arrester also may include one or more spark gap assemblies housed within the insulative enclosure and electrically connected in series with the varistors. Some arresters also include electrically conductive spacer elements coaxially aligned with the varistors and gap assemblies.

For proper arrester operation, contact must be maintained between the components of the stack. To accomplish this, it is known to apply an axial load to the elements of the stack. Good axial contact is important to ensure a relatively low contact resistance between the adjacent faces of the elements, to ensure a relatively uniform current distribution through the elements, and to provide good heat transfer between the elements and the end terminals.

One way to apply this load is to employ springs within the housing to urge the stacked elements into engagement with one another. Another way to apply the load is to wrap the stack of arrester elements with glass fibers so as to axially-compress the elements within the stack.

The disclosed concept provides a polymer membrane for housing stacked elements in a hollow core arrester that exhibits improved alignment capability and mechanical strength, while being capable of manufacture at a low cost.

SUMMARY

In one aspect, the disclosed concept includes an arrester membrane having a hollow core for housing stacked electrical elements, which includes a pultruded tube having a plurality of protrusions extending into the hollow core, the pultruded tube includes a plurality of fibers; and resin, wherein the plurality of fibers are impregnated into the resin and said plurality of fibers are at least predominately oriented in a longitudinal direction; at least one wrap layer applied to an outer surface of the pultruded tube, the at least one wrap layer including a plurality of fibers; and resin, wherein the plurality of fibers are impregnated into the resin to form a mat or fabric, and said plurality of fibers are at least predominately oriented in a radial direction; and an outer enclosure applied to a surface of the at least one wrap layer, the outer enclosure comprising polymer.

The plurality of fibers can comprise glass fibers. The resin can be selected from the group consisting of polyester, polyurethane, vinyl ester, epoxy and mixtures thereof. In certain embodiments, the resin is epoxy.

The polymer can be a rubber material. In certain embodiments, the rubber material is selected from the group consisting of silicone rubber.

The plurality of protrusions can be in a hemispherical shape. In certain embodiments, the pultruded tube and the plurality of protrusions are fabricated into a single part.

In certain embodiments, at least one wrap layer is applied to the outer surface of the pultruded tube by wrapping and curing. The outer enclosure can be applied to the outer surface of the at least one wrap layer by over molding. The at least one wrap layer can include at least one winding, or the at least one wrap layer can include multiple windings. Further, there can be multiple wrap layers.

In certain embodiments, the pultruded tube has a higher glass fiber to resin ratio than the at least one wrap layer. The pultruded tube can have a cantilever strength of at least 70,000 in-lbs. For the pultrudued tube, the glass fibers can constitute from about 50% to about 90% by weight, and the resin can constitute from about 20% to about 25% by weight, based on total weight of the pultruded tube. For the at least one wrap layer, the glass fibers can constitute from about 25% to about 60% by weight, and the resin can constitute about 40% by weight, based on total weight of the layer.

The membrane can be structured to have a burst strength that withstands energy generated during a 65 kA electrical fault current.

In another aspect, the disclosed concept provides a method of making an arrester membrane having a hollow core for housing stacked electrical elements. The method includes forming a pultruded tube by impregnating resin with glass fibers in a pultrusion process in a tubular shape having a plurality of protrusions extending into the hollow core, the glass fibers being at least predominately oriented in a longitudinal direction; forming at least one wrap layer by impregnating resin with glass fibers to form a mat or fabric, the glass fibers being at least predominately oriented in a radial direction; wrapping the mat or fabric onto an outer surface of the pultruded tube, wherein the wrapping comprises one or more windings; curing; and forming an outer enclosure by over molding the at least one wrap layer with polymer.

The at least one wrap layer can include multiple wrap layers and the outer enclosure can be formed by over molding a final wrap layer.

BRIEF DESCRIPTION OF THE DRAWINGS

A full understanding of the disclosed concept can be gained from the following description of the preferred embodiments when read in conjunction with the accompanying drawings in which:

FIG. 5 is a schematic showing a configuration of fibers in resin for a pultruded tube of a hollow core arrester membrane, in accordance with certain embodiments of the disclosed concept;

FIG. 6 is a schematic showing a configuration of fibers in resin for a wrapped layer of a hollow core arrester membrane, in accordance with certain embodiments of the disclosed concept;

FIG. 7 is a cross-section view of the pultruded tube of FIG. 3 further including an enclosure, in accordance with certain embodiments of the disclosed concept.

DESCRIPTION OF THE PREFERRED EMBODIMENTS

Figure 1:
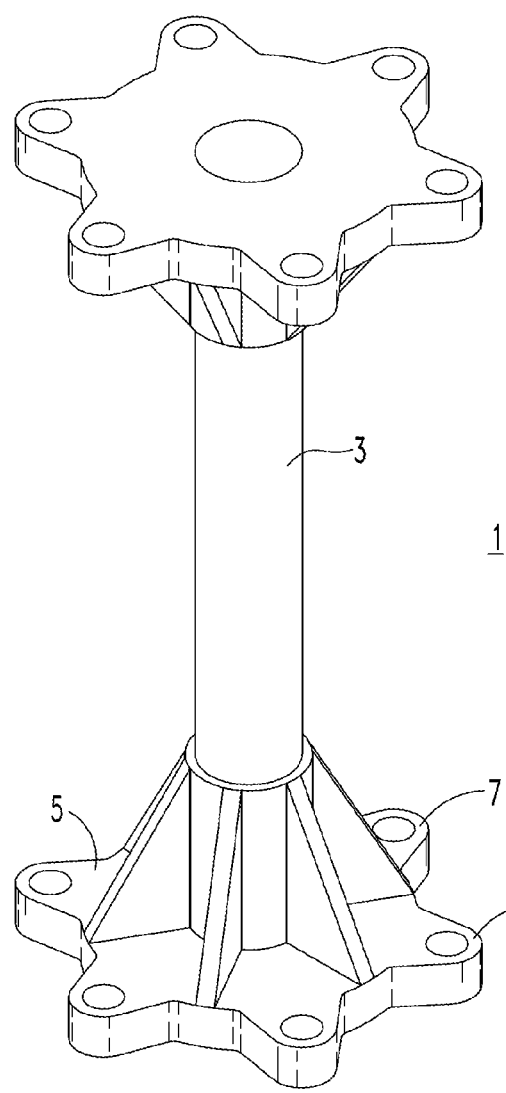
FIG. 1 is an isometric view of a pultruded, wrapped tube of a hollow core arrester membrane, in accordance with certain embodiments of the disclosed concept.

For purposes of the description hereinafter, directional phrases used herein such as, for example, "top", "bottom", "front", "back", "behind", "side", "right", "left", "upper", "lower", and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the term "number" shall mean one or an integer greater than one (i.e., a plurality).

As employed herein, the statement that two or more parts are "connected" together shall mean that the parts are joined together either directly or joined through one or more intermediate parts.

The disclosed concept relates to arresters and, in particular, to hollow core arrester membranes or composites that provide high strength in both longitudinal and radial directions. Various arrester designs are known in the art. More than one arrester can be employed and the arresters can be stacked. Also known are various elongated outer enclosures or housings made of an electrically insulating material that contain an array of electrical components that form the arrester. For example, a pair of electrical terminals at opposite ends of the enclosure can connect the arrester between a line-potential conductor and electrical ground, a stack of voltage-dependent, nonlinear resistive elements, e.g., varistors, and one or more spark gap assemblies.

There are various types of arresters for use in different power systems, which have voltage ratings associated therewith. In accordance with the disclosed concept, the arresters have a voltage rating of about 3 KV and higher or preferably, from about 230 KV to about 1100 KV.

The disclosed concept includes hollow core arrester membranes that include a tube formed by pultrusion and one or more layers formed by wrapping or winding resin-impregnated fabric, e.g., "pre-preg", such as, in the form of a mat, onto an outer surface of the pultruded tube.

FIG. 1 shows a wrapped, pultruded tube 1 in accordance with certain embodiments of the disclosed concept. The tube 1 is formed in the shape of an elongated cylinder 3. The length of the cylinder 3 can vary and, typically, the length is about four feet or less. As shown in FIG. 1, each end of the cylinder 3 is connected to an end fitting 5 having a plurality of holes 7 formed therein. The cylinder 3 can be secured to a surface utilizing fasteners, e.g., bolts or screws (not shown), in the plurality of holes 7. Each end fitting 5 may be selected from various mechanisms that are known in the art. An end fitting 5 is typically manufactured and selected to withstand a particular force or exhibit a particular strength, and the fasteners are selected in accordance therewith. Further, mechanisms for connecting the end fitting 5 to each end of the cylinder 3 may be selected from those known in the art. In certain embodiments, an adhesive material is used.

Figure 2:
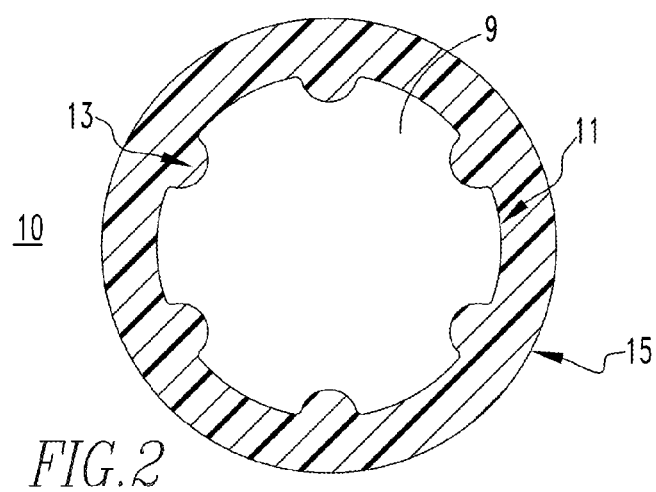
FIG. 2 is a cross section of a pultruded tube of a hollow core arrester membrane, in accordance with certain embodiments of the disclosed concept.

FIG. 2 is a cross section of a pultruded tube 10. FIG. 2 shows a hollow core 9 of the tube 10, an inner surface 11 and an outer surface 15. The inner surface 11 includes a plurality of protrusions 13. Electrical components and elements (not shown) are contained, e.g., stacked, within the hollow core 9. The inner surface 11 is effective to enclose the electrical components and elements, and the plurality of protrusions 13 serves as a centering device to contribute to the vertical alignment of the stacked electrical components and elements. The plurality of protrusions 13, as shown in FIG. 2, include six hemisphere-shaped protrusions, however, it is contemplated that more or less than six protrusions can be used, and it is further understood that a wide variety of other shapes may be formed. The number of protrusions and the shape of the protrusions are not limiting, and are selected such that they are capable of maintaining alignment of the electrical components and elements stacked within the hollow core 9 of the tube 10.

The pultruded tube 10 is composed of a plurality of fibers coated with a resin and formed into a tubular shape using pultrusion apparatus and processes. The term "pultrusion" refers to the actions of "pull" and "extrusion". In general, reinforcement material, such as, fibers, are impregnated with resin and pulled through a heated stationary die wherein the resin undergoes polymerization. The impregnation can be accomplished by either pulling the reinforcement material through a bath or by injecting the resin into a chamber that typically is connected to the die. A wide variety of fibers and resins known in the art are suitable for use in the pultrusion process. Suitable fibers include glass fibers and, suitable resins include polyester, polyurethane, vinyl ester, epoxy and combinations or mixtures thereof. In certain embodiments, the pultruded tube 10 is composed of glass fibers and epoxy.

As shown in FIG. 2, the plurality of protrusions 13 are integrated with the inner surface 11 of the pultruded tube 10, such as to form a single piece or part. Thus, the plurality of protrusions 13 can be formed during the pultrusion process in forming the pultruded tube 10. As a result, a separate centering device, e.g., rod or rubber inserts, which are known in the prior art for use in arresters, are not needed for alignment in the disclosed concept.

The amount of the fiber component and the resin component of the pultruded tube can vary. In certain embodiments, the pultruded tube includes from about 75% to about 80% by weight glass fibers and from about 20% to about 25% by weight resin, based on total weight of the tube. In general, the amount of the glass fiber component is selected at about 90% or less, due to the likelihood of processing difficulties when the glass fiber component exceeds about 90%. Further, in general, the amount of the fiber component is selected at about 50% or greater, due to the likelihood of mechanical weakness when the glass fiber component is less than about 50%.

Figure 3:
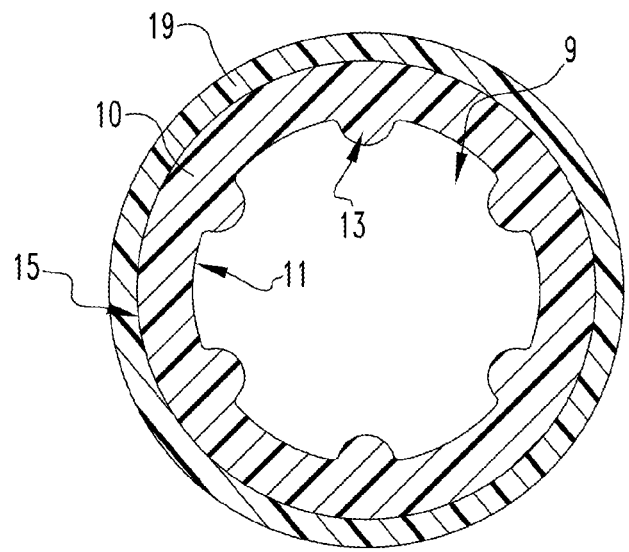
FIG. 3 is a cross-section view the pultruded tube of FIG. 2 further including a wrapped layer, in accordance with certain embodiments of the disclosed concept.

FIG. 3 is a cross section of the pultruded tube 10 as shown in FIG. 2. FIG. 3 shows the hollow core 9, the inner surface 11, the plurality of protrusions 13 and the outer surface 15 as shown in FIG. 2. In addition, FIG. 3 shows a first layer 19 that is wrapped onto the outer surface 15 of the pultruded tube 10. In certain embodiments, the first layer 19 is wrapped or wound onto the outer surface 15 of the pultruded tube 10 by use of conventional wrapping/winding apparatus and techniques. It is typical, after wrapping the first layer 19 onto the pultruded tube 10 to heat the wrapped, pultruded tube to an elevated temperature sufficient to cure, e.g., polymerize, the mat or fabric and therefore, bond the first layer 19 to the outer surface 15.

The first layer 19 includes a mat or fabric composed of glass fibers and resin, such as, epoxy. The resin can be selected from those known in the art and above-described herein. The glass fibers and resin, e.g., epoxy, for the first layer 19 may be the same or different from the glass fibers and resin, e.g., epoxy, used for the pultruded tube 10. As described above, both of the pultruded tube 10 and the first layer 19 are composed of glass fibers and resin. The pultruded tube 10 has a glass fiber to resin ratio that is larger than the glass fiber to resin ratio of the first layer 19. Thus, the pultruded tube 10 is a more dense material than the first layer 19. The first layer 19 can have the form of an open weave material.

The amount of the fiber component and the resin component of the first layer 19 (e.g., pre-preg resin coated fiber matrix) can vary. In certain embodiments, the first layer 19 includes about 60% glass fibers and about 40% resin, based on total weight of the layer. In general, the amount of the glass fiber component is selected at about 70% or less, or about 65% or less, due to the likelihood of processing difficulties when the glass fiber component exceeds about 70% or about 65%. Further, in general, the amount of the glass fiber component is selected at about 25% or greater, due to the likelihood of mechanical weakness when the glass fiber component is less than about 25%.

The first layer 19 can include a single winding or multiple windings of the mat or fabric. The wrap to weft ratio can vary. Further, subsequent layers (in addition to the first layer 19) may be applied to the pultruded tube 10. For example, a second layer can be wrapped or wound onto an outer surface of the first layer 19 and, a third layer can be wrapped or wound onto an outer surface of the second layer. Each additional layer can include a single winding or multiple windings.

Figure 4:
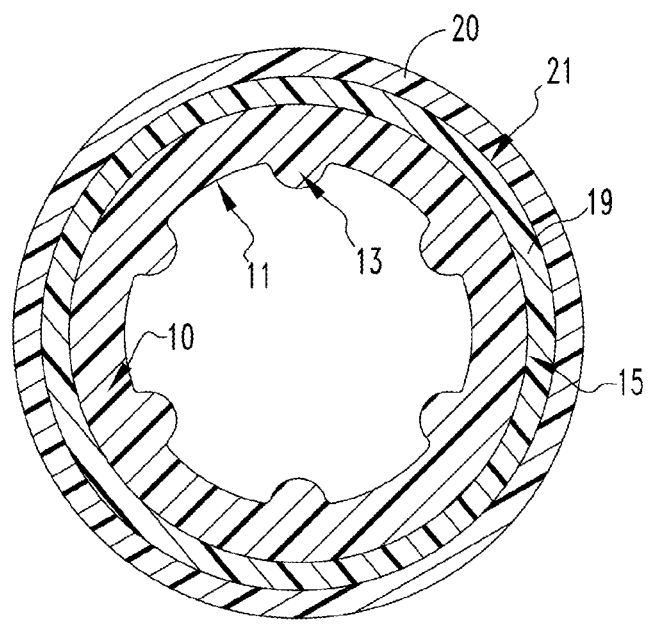
FIG. 4 is a cross-section view the pultruded tube of FIG. 3 further including a second wrapped layer, in accordance with certain embodiments of the disclosed concept.

FIG. 4 is a cross section of the pultruded tube 10 shown in FIG. 3 that includes the first layer 19. In addition, FIG. 4 includes a second layer 20, which is also composed of glass fibers and resin in the form of a mat or fabric (as described above for the first layer 19). The second layer 20 is wrapped or wound onto the outer surface 21 of the first layer 19 by use of conventional wrapping/winding apparatus and techniques. It is typical for the second layer 20 to be wrapped or wound onto the first layer 19 prior to curing the first layer 19, such that, after wrapping the second layer 20 onto the first layer 19, heating takes place to an elevated temperature sufficient to cure, e.g., polymerize, the mat or fabric and therefore, bond the first and second layers 19,20. The mat or fabric of the second layer 20 is different from the mat or fabric of the layer 19. That is, the second layer 20 has a composition that is different from the first layer 19 and may exhibit different properties or characteristics. For example, the difference between the first and second layers 19,20 may be one or more of the following: fiber composition, resin composition, ratio of fiber to resin and orientation of the fibers.

In certain embodiments, as above-mentioned, one or more subsequent layers can be applied to the second layer 20. For example, a third layer may be applied to the outer surface of the second layer 20 using the procedure described above for the first and second layers 19 and 20, respectively.

FIG. 5 shows a view of a pultruded tube material 30, in accordance with certain embodiments of the disclosed concept. As shown in FIG. 5, a plurality of fibers 23 are impregnated into a resin 24. Furthermore, the plurality of fibers 23 are oriented in a longitudinal direction as shown by the arrow.

FIG. 6 shows a view of a wrap material 40, in accordance with certain embodiments of the disclosed concept. As shown in FIG. 6, a plurality of fibers 25 are impregnated into a resin 26. Furthermore, the plurality of fibers 25 are oriented in a radial direction as shown by the arrow. As shown in FIG. 6, each and every one of the plurality of fibers 25 are oriented in a radial direction. However, it is understood that in practice, the plurality of fibers 25 may be predominantly oriented in a radial direction and therefore, some of the plurality of fibers 25 may not be oriented in a radial direction.

In general, it has been found that the pultruded tube provides about 70% to about 80% of the cantilever strength but only about 15% to about 30% of the radial (burst) strength.

The pultruded tube in combination with one or more layers of the wrap material (e.g., pre-preg) can provide a cantilever strength that exceeds 80,000 in-lbs. The burst/radial strength is typically determined by the arrester product that passes a 65 kA or greater electrical fault current test, and not necessarily a stated or known mechanical requirement. A large amount of energy is generated during testing in an attempt to burst the product. In practice, an arrester product is required to pass at least a 65 kA fault current test and, preferably, a 80 kA fault current test. In certain embodiments, a mechanical structure, such as an arrester, which is based on a pultruded tube with a glass fiber content of at least 50% that is over-wound with a glass fiber mat, achieves a cantilever strength of at least 70,000 in-lbs., while also providing the burst strength required to withstand the energy generated during a 65 kA electrical fault current.

FIG. 7 is a cross section of the pultruded tube 10 as shown in FIG. 3. FIG. 7 shows the hollow core 9, the inner surface 11, the plurality of protrusions 13, the outer surface 15 and the first layer 19 as shown in FIG. 3. In addition, FIG. 7 includes an outer enclosure 29 formed on the outer surface 21 (as shown in FIG. 4) of the first layer 19. It is contemplated and understood, as described above, that more than one wrap layer may be applied to the pultruded tube 10 (such as the second layer 20 shown in FIG. 4) and therefore, the outer enclosure 29 is formed on an outer surface of the final wrap layer. The outer enclosure 29 is composed of polymer, such as, rubber material, which includes but is not limited to silicon rubber, ethylene propylene diene monomer (EPDM) rubber, and mixtures or combinations thereof. In certain embodiments of the disclosed concept, the outer enclosure 29 is formed by over molding the first layer 19 with the polymer. Conventional injection molding apparatus and techniques known in the art are suitable for use in the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An arrester membrane having a hollow core for housing stacked electrical elements, comprising:
   a pultruded tube having a plurality of protrusions extending into the hollow core, the pultruded tube comprising:
      a plurality of fibers; and
      resin,
   wherein the plurality of fibers are impregnated into the resin and said plurality of fibers are at least predominately oriented in a longitudinal direction;
   at least one wrap layer applied to an outer surface of the pultruded tube, the at least one wrap layer comprising:
      a plurality of fibers; and
      resin,
   wherein the plurality of fibers are impregnated into the resin to form a mat or fabric, and said plurality of fibers are at least predominately oriented in a radial direction; and
   an outer enclosure applied to a surface of the at least one wrap layer, the outer enclosure comprising polymer.

2. The arrester membrane of claim 1, wherein the plurality of fibers comprise glass fibers.

3. The arrester membrane of claim 1, wherein the resin is selected from the group consisting of polyester, polyurethane, vinyl ester, epoxy and mixtures thereof.

4. The arrester membrane of claim 1, wherein the resin is epoxy.

5. The arrester membrane of claim 1, wherein the polymer is a rubber material.

6. The arrester membrane of claim 5, wherein the rubber material is selected from the group consisting of silicone rubber.

7. The arrester membrane of claim 1, wherein the plurality of protrusions are in a hemispherical shape.

8. The arrester membrane of claim 1, wherein the pultruded tube and the plurality of protrusions are fabricated into a single part.

9. The arrester membrane of claim 1, wherein the at least one wrap layer is applied to the outer surface of the pultruded tube by wrapping and curing.

10. The arrester membrane of claim 1, wherein the outer enclosure is applied to the outer surface of the at least one wrap layer by over molding.

11. The arrester membrane of claim 1, wherein the at least one wrap layer comprises at least one winding.

12. The arrester membrane of claim 11, wherein the at least one wrap layer comprises multiple windings.

13. The arrester membrane of claim 1, wherein the at least one wrap layer comprises multiple wrap layers.

14. The arrester membrane of claim 1, wherein the pultruded tube has a higher glass fiber to resin ratio than the at least one wrap layer.

15. The arrester membrane of claim 1, wherein the pultruded tube has a cantilever strength of at least 70,000 in-lbs.

16. The arrester membrane of claim 1, wherein for the pultrudued tube, the glass fibers constitute from about 50% to about 90% by weight, and the resin constitutes from about 20% to about 25% by weight, based on total weight of the pultruded tube.

17. The arrester membrane of claim 1, wherein for the at least one wrap layer, the glass fibers constitute from about 25% to about 60% by weight, and the resin constitutes about 40% by weight, based on total weight of the layer.

18. The arrester membrane of claim 1, wherein said membrane is structured to have a burst strength that withstands energy generated during a 65 kA electrical fault current.

19. A method of making an arrester membrane having a hollow core for housing stacked electrical elements, comprising:
   forming a pultruded tube by impregnating resin with glass fibers in a pultrusion process in a tubular shape having a plurality of protrusions extending into the hollow core, the glass fibers being at least predominately oriented in a longitudinal direction;
   forming at least one wrap layer by impregnating resin with glass fibers to form a mat or fabric, the glass fibers being at least predominately oriented in a radial direction;
   wrapping the mat or fabric onto an outer surface of the pultruded tube, wherein the wrapping comprises one or more windings;
   curing; and
   forming an outer enclosure by over molding the at least one wrap layer with polymer.

20. The method of claim 19, wherein the at least one wrap layer comprises multiple wrap layers and the outer enclosure is formed by over molding a final wrap layer.

* * * * *